(12) United States Patent
Ignatchenko et al.

(10) Patent No.: US 7,778,492 B2
(45) Date of Patent: Aug. 17, 2010

(54) SYSTEM AND METHOD FOR SCALING DIGITAL IMAGES

(75) Inventors: Sergey Ignatchenko, Cariari (CR); Victor Gavrysh, Toronto (CA); Dmitri Ligoum, Aurora (CA)

(73) Assignee: Oldford Group Limited, Tortola (VG)

( * ) Notice: Subject to any disclaimer, the term of this patent is extended or adjusted under 35 U.S.C. 154(b) by 1170 days.

(21) Appl. No.: 11/396,917

(22) Filed: Apr. 4, 2006

(65) Prior Publication Data

US 2007/0230828 A1 Oct. 4, 2007

(51) Int. Cl.
*G06K 9/32* (2006.01)

(52) U.S. Cl. .................. 382/298; 345/472; 345/660
(58) Field of Classification Search ............... 345/472, 345/587, 660, 668, 669; 358/1.1; 382/298, 382/299, 300, 301; 715/800, 815, 838
See application file for complete search history.

(56) References Cited

U.S. PATENT DOCUMENTS

| | | | |
|---|---|---|---|
| 4,684,935 A | 8/1987 | Fujisaku et al. | |
| 5,313,573 A | 5/1994 | Takahama | |
| 5,485,563 A | 1/1996 | Fisher | |
| 5,710,880 A | 1/1998 | Howlett et al. | |
| 5,737,501 A | 4/1998 | Tsunekawa | |
| 5,867,166 A | 2/1999 | Myhrvold et al. | |
| 6,038,031 A | 3/2000 | Murphy | |
| 6,131,103 A | 10/2000 | Yun | |
| 6,134,567 A | 10/2000 | Nakkiran et al. | |
| 6,161,114 A | 12/2000 | King et al. | |
| 6,262,708 B1* | 7/2001 | Chu ........................... 345/667 | |
| 6,278,438 B1 | 8/2001 | Parrott | |
| 6,281,874 B1 | 8/2001 | Sivan et al. | |
| 6,600,490 B1 | 7/2003 | Brock et al. | |
| 6,636,235 B1 | 10/2003 | Cooper et al. | |
| 6,674,903 B1 | 1/2004 | Cliquet | |
| 6,753,862 B1 | 6/2004 | Miyasaka et al. | |
| 6,870,535 B2 | 3/2005 | Hill et al. | |
| 6,873,343 B2 | 3/2005 | Chui | |
| 7,006,091 B2 | 2/2006 | Masera et al. | |
| 2001/0020950 A1 | 9/2001 | Shimizu | |
| 2002/0105531 A1 | 8/2002 | Niemi | |
| 2002/0114534 A1 | 8/2002 | Nakamura | |
| 2002/0120653 A1 | 8/2002 | Kraft | |
| 2003/0179214 A1* | 9/2003 | Saund et al. ................. 345/619 |
| 2005/0254071 A1 | 11/2005 | He | |

(Continued)

FOREIGN PATENT DOCUMENTS

EP 0 724 229 A2 7/1996

(Continued)

OTHER PUBLICATIONS

Wikipedia, the Free Encyclopedia, "Mipmap", Mar. 13, 2006, http://en,wikipedia.org/wiki/Mipmap; from IDS received Jul. 24, 2006, item No. AL2.*

(Continued)

*Primary Examiner*—Bhavesh M Mehta
*Assistant Examiner*—Gregory F Cunningham
(74) *Attorney, Agent, or Firm*—Kenyon & Kenyon LLP (57) ABSTRACT

Methods, computer devices, and computer readable media containing instructions for executing such methods are provided for the modification of digital images having a plurality of visual elements.

9 Claims, 6 Drawing Sheets

U.S. PATENT DOCUMENTS

2006/0020899 A1   1/2006   Gusmorino et al.

FOREIGN PATENT DOCUMENTS

| EP | 0 982 668 A2 | 3/2000 |
| EP | 1 241 657 A2 | 9/2002 |
| EP | 0 827 615 B1 | 7/2004 |
| WO | 02/061682 A1 | 8/2002 |

OTHER PUBLICATIONS

Biancardi et al., "Improvements to image magnification", *Pattern Recognition*, 35:677-687 (2002).

Gerek et al., "A multiresolution block coding method for visualization of compressed images in multimedia applications", *SPIE*, vol. 2308, pp. 954-962 (1994).

Huang et al., "Super-Resolution Techniques for Image Sequence Enlargement", *Proceedings of the 6th IASTED International Conference Signal and Image Processing*, pp. 648-653 (2004).

*Wikipedia, the Free Encyclopedia*, "Bicubic interpolation", Mar. 13, 2006, http://en.wikipedia.org/wiki/Bicubic_interpolation.

*Wikipedia, the Free Encyclopedia*, "Bilinear filtering", Mar. 13, 2006, http://en.wikipedia.org/wiki/Bilinear_filtering.

*Wikipedia, the Free Encyclopedia*, "Mipmap", Mar. 13, 2006, http://en.wikipedia.org/wiki/Mipmap.

*Wikipedia, the Free Encyclopedia*, "Raster graphics", Mar. 13, 2006, http://en.wikipedia.org/wiki/Bitmapped_image.

* cited by examiner

SYSTEM AND METHOD FOR SCALING DIGITAL IMAGES

TECHNICAL FIELD

The present disclosure relates generally to digital images. More specifically, the present disclosure relates to systems and methods for scaling digital images.

BACKGROUND

Digital images are often created as bitmaps formed of one or more visual elements within the image. Digital images may result from either real world capture or computer generation of an image. A scanner or a digital camera may be used to capture digital images. Computer generation may be performed with the use of a paint program, screen capture, the conversion of a graphic into a bitmap image, and the like. Digital images may also be compressed using any appropriate compression algorithm.

Digital images are often created with a native or default resolution. Often with such images it is desirable to scale the size of the image to a second resolution to suit the users requirements or desires. For example, the image may be scaled to enlarge the image to occupy all or substantially all of a computer monitor, or scaled to reduced the image to allow for multiple images to be displayed on a monitor. In addition, it is often desirable to further re-scale images from a second resolution to a third or subsequent resolution. However, in scaling the image, certain elements of the image may lose clarity, definition or sharpness. For example, in creating two-dimensional graphics having relatively small or detailed elements, it is sometimes observed that the smaller elements loose clarity when the image is resized.

Instead of scaling an image, one could choose to prepare multiple versions of the image at all possible resolutions or sizes. This technique, however, is not practicable as it requires that multiple versions of the entire image be prepared and because it requires a large amount of computer storage to store multiple versions of the same image. Additionally, some existing scaling methods and algorithms only allow the user to reduce image size (and resolution), rather than enlarge an image.

What is needed therefore is a system and method for resizing a digital image that maintains the clarity and sharpness of at least some of the elements of the image while maintaining a manageable file size of the graphics, and will allow the user to either enlarge or reduce the image size.

SUMMARY

In one embodiment, the present disclosure provides a method of altering the size of a digital image having a plurality of visual elements and displayed on a monitor, the method comprising: separating the plurality of visual elements into at least two groups; and resizing the visual elements using at least two different scaling techniques corresponding to the number of groups of visual elements in the digital image.

In another embodiment, the present disclosure provides a method for modifying the size of an image having a plurality of visual elements displayed thereon, comprising: providing a first image having a plurality of visual elements; scaling a first group of visual elements in the image in response to user input to correspond to a target image size, where the elements are scaled using a scaling algorithm; selecting a corresponding element from a plurality of different size visual elements in a second group of elements, where the different size visual element is selected from a set of different sized pre-drawn images corresponding to a each element in the second group of elements; and combining the visual elements from the first and second groups of visual elements to form a second image.

In yet another embodiment, the present disclosure also provides a computing device configured for scaling a first digital image having a plurality of visual images from a first size to a second size, the computing device comprising: a processor; memory in electronic communication with the processor; and executable instructions executable by the processor, where the executable instructions are configured to implement a method comprising: scaling a first group of visual elements in the image in response to user input to correspond to a target image size, where the elements are re-sized using a scaling algorithm; selecting a corresponding element from a plurality of different size visual elements in a second group of elements, where the different size visual element is selected from a set of different sized pre-drawn images corresponding to a each element in the second group of elements; and combining the visual elements from the first and second groups of visual elements to form a second image.

The present disclosure further provides a computer-readable medium for storing program data, where the program data comprises executable instructions for implementing a method for modifying the size of an image having a plurality of visual elements, the method comprising: scaling a first group of visual elements in the image in response to user input to correspond to a target image size, where the elements are re-sized using a scaling algorithm using a reference element for each element within the first group of visual elements; selecting a corresponding element from a plurality of different size visual elements in a second group of elements, where the different size visual element is selected from a set of different sized pre-drawn visual elements corresponding to a each element in the second group of elements; and combining the visual elements from the first and second groups of visual elements to form a second image.

DETAILED DESCRIPTION

The present disclosure provides systems and methods for the modification of the size and/or resolution of an image having a plurality of visual elements. Preferably, the systems and methods relate to the reducing or enlarging, or systems and methods for reducing and enlarging of images. In a preferred embodiment, the images to be modified may be digital images stored on a computer readable medium.

The systems and methods of the present disclosure may be used with respect to any digital image, including, for example, gaming applications, such as online gaming applications. In a preferred embodiment, the systems and methods of the present disclosure may be used to modify the size of images in an online poker gaming application.

Many different graphics file formats exist and may be used with the present methods including, but not limited to, JPEG, GIF, BMP, TIFF, PNG, etc. It is to be understood that as new image file formats may be developed, they may be used with the systems and methods discussed here. In addition, the systems and methods disclosed here may operate on an image stored in memory temporarily as it is being operated on in a larger process or system. Image size may be measured using any method available or appropriate, including, but not limited to pixel count (e.g. 1024×768 pixels), physical size (e.g. 4"×6"), and resolution (e.g. 72 pixels per inch (ppi)).

In one embodiment, the digital image is comprised of multiple visual elements. For example, in an image representing an overhead view of a poker table, the individual elements may comprise, the table, the players, the dealer, the cards, the chips, as well as text.

In one embodiment, elements of an image may be divided into at least two different groups. For example, elements of a single image may be divided into one group of elements for which several versions of each image at different resolutions may be prepared. Another set of elements may be identified for which a default resolution element may be prepared for each element. The default elements of the second set may then be resized using a scaling algorithm.

Figure 1:
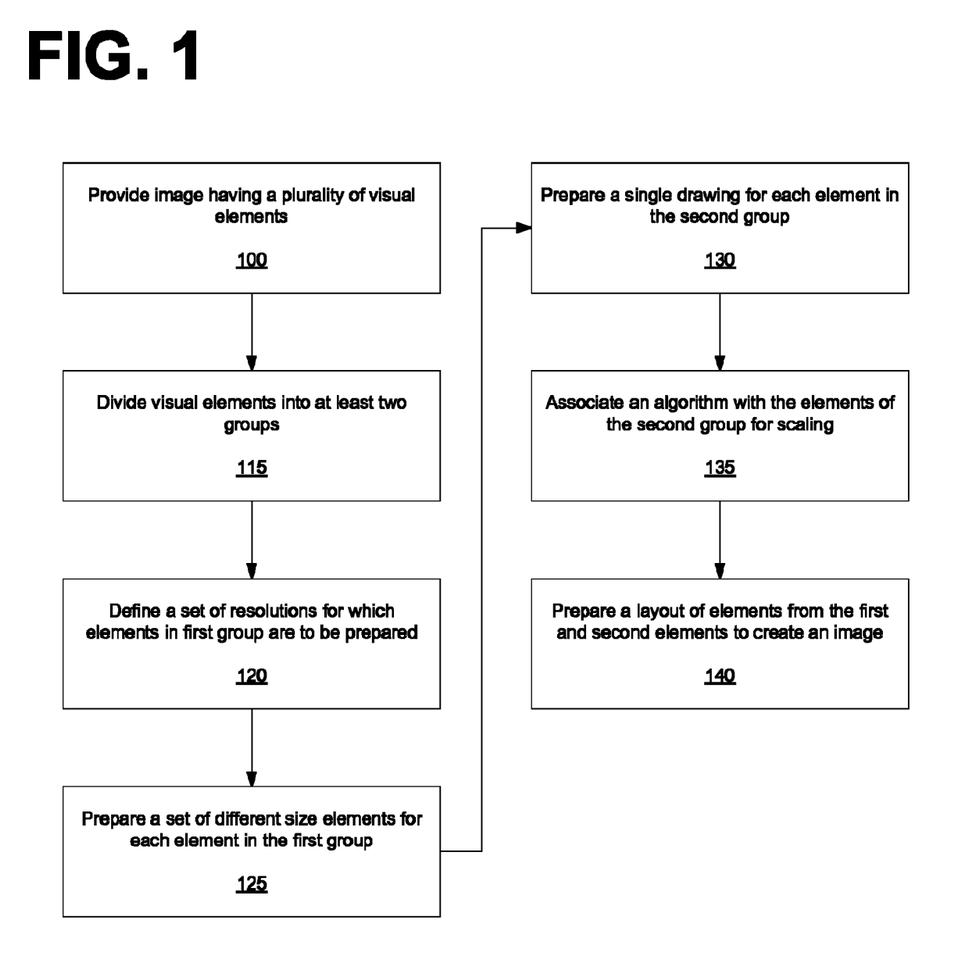
FIG. 1 provides a flowchart of one embodiment of a method for preparing an image at a default size or resolution.

Referring to FIG. 1, the method generally involves separating all of the visual elements of an image into at least two categories. The elements may be categorized based on any set of criteria, including, but not limited to, importance to the image, size in comparison to the remainder of the image, and detail of the element. In one embodiment, images containing larger and smaller elements may be separated into "small" and "large" categories.

Once the visual elements are categorized, for elements placed into one group (for example, important, small or detailed elements), a set of resolutions may be identified for which these elements will be prepared. For example, a default or reference resolution is identified which will correspond to the initial image size and/or resolution when the image is first displayed on a monitor. Then, a set of smaller or a set of larger resolutions, or both smaller and larger resolutions, may be identified for which a set of individual sized elements may be prepared. Any number of smaller, larger or both smaller and larger resolutions may be identified. In one embodiment, a set of seven resolutions may be identified, for which the fourth resolution corresponds to the reference or default resolution. Then, three smaller resolutions may be identified and three larger resolutions may be identified.

Once the number of resolutions is identified, for each visual element in the first group, the element may be prepared or drawn at each resolution in the set of resolutions. The versions of the elements at different resolutions may be prepared using any method available for preparing individual elements of an image (e.g., by individually preparing each visual element at each resolution in the set of resolutions). Such sets of prepared elements of different resolutions may also be referred to as a library of pre-sized or pre-drawn elements.

For the visual elements of the image that may be grouped in a second category, the elements may be prepared at a default or reference resolution. These elements of the image may be resized using any available scaling algorithm, for example, a bilinear algorithm, bicubic algorithm, Win32 StretchBlt algorithm, Win32 StretchBlt with HALFTONE parameter algorithm, Mitchell algorithm, sinc algorithm, bessel algorithm, lanczos algorithm, catrom algorithm, cubic algorithm, quadratic algorithm, gaussian algorithm, blackman algorithm, hamming algorithm, hanning algorithm, hermite algorithm, triangle algorithm, box algorithm, and point algorithm, or combinations thereof. In a preferred embodiment, such elements may be resized in response to user input or manipulation using a bilinear algorithm.

Once the individual visual elements of an image are prepared for each category, a layout is prepared for the image that coordinates the location of each visual element for an identified default image resolution, $W_R \times H_R$.

The systems and methods described here allow the resizing of an image from a default-size resolution to a different or target image size in response to any form of input. In a preferred embodiment, the image may be resized in response to user input based on the user's preference for the size of the image (e.g., the amount of space that the image occupies on a monitor). For example, a user may resize the image from a default-size to a different or target size by clicking and dragging a resizing handle.

In resizing the image to a target size, the method of the present disclosure may select from a library of pre-sized elements the appropriately sized version of the visual element that substantially matches the rescale size of the elements in the second category. With respect to the visual elements in the second category, the method may use a scaling algorithm to resize the visual elements in the one category from the default size. The method combines the elements from the two categories to form a re-sized image. In one embodiment, where the target image size is between the prepared resolutions of elements in the first category, the program may do the following: (1) calculate coordinates of all the elements (both category 1 and category 2) for resolution $W_{R1} \times H_{R1}$ (one of possible way to do this is as follows: $X = X_0 * W_{R1}/W_R$, $Y = Y_0 * H_{R1}/H_R$, where $X_0$ and $Y_0$ are coordinates in the original 'layout' from above, and X and Y are coordinates for arbitrary resolution $W_{R1} \times H_{R1}$); (2) display "category 2" elements using one of scaling algorithms (for example, bilinear); (3) display "category 1" elements in one of pre-drawn resolutions (closest one to $W_{R1} \times H_{R1}$). In one embodiment, the method will result in a change in proportions between the elements of category 1 and category 2, but the amount of distortion may be reduced depending on the number and size of pre-drawn elements in the library of pre-drawn elements.

A system configured for re-sizing a digital image from a first size to a second size is also disclosed. The system includes a processor and a memory in electronic communication with the processor. Executable instructions executable by the processor and stored in the memory may also included that may be configured to implement a method for re-sizing a digital image from a first size to a second size as disclosed herein.

A computer-readable medium for storing program data is also disclosed. The program data includes executable instructions for implementing a method for re-sizing an image from a first size to a second size as disclosed herein.

It will be readily understood that the components of the embodiments as generally described and illustrated in the Figures herein could be arranged and designed in a wide variety of different configurations. Thus, the following more detailed description of the embodiments of the systems and methods of the present invention, as represented in the Figures, is not intended to limit the scope of the invention, as claimed, but is merely representative of the embodiments of the invention.

Several aspects of the embodiments described herein will be illustrated as software programs or components stored in a computing device. As used herein, a software program or component may include any type of computer instruction or computer executable code located within a memory device and/or transmitted as electronic signals over a system bus or network. A software program may, for instance, comprise one or more physical or logical blocks of computer instructions, which may be organized as a routine, program, object, component, data structure, etc., that performs one or more tasks or implements particular abstract data types.

In certain embodiments, a particular software program may comprise disparate instructions stored in different locations of a memory device, which together implement the described functionality of the program. Indeed, a program may comprise a single instruction, or many instructions, and may be distributed over several different code segments, among different programs, and across several memory devices. Some embodiments may be practiced in a distributed computing environment where tasks may be performed by a remote processing device linked through a communications network. In a distributed computing environment, software programs may be located in local and/or remote memory storage devices.

Note that the exemplary embodiment is provided as an exemplar throughout this discussion, however, alternate embodiments may incorporate various aspects without departing from the scope of the present invention.

The order of the steps or actions of the methods described in connection with the embodiments disclosed herein may be changed by those skilled in the art without departing from the scope of the present invention. Thus, any order in the Figures or detailed description is for illustrative purposes only and is not meant to imply a required order.

FIG. 1 is a flow diagram of a preferred embodiment of a method for preparing an image at a default size or resolution. At step 100, an image is provided having a plurality of visual elements. The image has an original (or first) size or resolution. In the embodiment of an image for an online poker gaming application, the original image size may be set at 794×548 pixels. At step 115, the plurality of visual elements may be divided into at least two groups. At step 120 a set of sizes or resolutions may be defined for which elements in group one will be prepared. At step 125, a library of pre-sized visual elements for each of the elements identified in group one may be prepared that correspond to the defined sizes or resolutions. At step 130, the visual elements in group two may be prepared at a default size or resolution. For example, in an online poker gaming application, visual elements identified in the second group, such as the table-top, players, and the dealer may be prepared at a default resolution. Steps 125 and 130 are presented in a preferred order, but may be performed in any order within the methods of the present disclosure. An algorithm is also identified for use in scaling the visual elements in the second group of elements, for example bilinear, bicubic, Win32 StretchBlt, Win32 StretchBlt with HALF-TONE parameter, or Mitchell algorithms. In a preferred embodiment, the visual elements in the second group may be operably associated with an algorithm which is capable of use in rescaling the elements in the second group of visual elements. In step 140, a layout is prepared that provides coordinates for each visual element of the image at a default resolution $W_R \times H_R$. For example, in the online poker gaming embodiment, a layout is prepared such that the players and dealer may be depicted as sitting at the poker table, and the players each have the respective number of chips associated with that player in appropriate proportion to each other.

Figure 2:
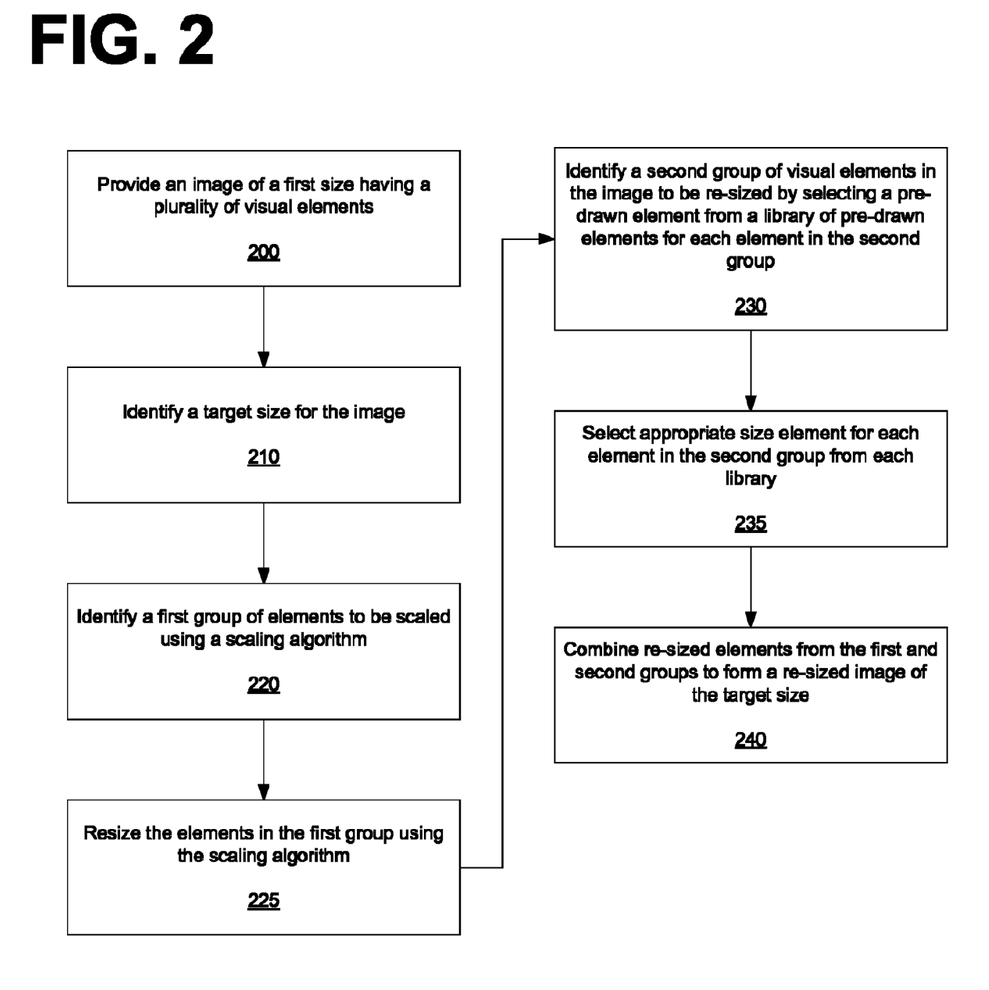
FIG. 2 provides a flowchart of another embodiment of a method for re-sizing an image of the present disclosure.

FIG. 2 is a flow diagram of a preferred embodiment of a method of re-sizing an image of the present disclosure. In step 200, an image of a first size is provided having multiple visual elements within the image. For example, in an online poker gaming application, an image providing a table surrounded by players and optionally a dealer. The image may also include poker chips and playing cards on the table. The image may also include a text box for in-game messaging. At step 210, a second or target size is identified for the image. The second or target size may be identified, for example, by a user manipulating the image using a window resizing handle. The second or target size may be either smaller or larger than the first size. At step 220, a group of visual elements is identified to be re-sized using a scaling algorithm to correspond to the second or target image size. At step 230, another group of visual elements is resized to correspond to the re-sized visual elements in the second group by selecting appropriately sized elements from a library of pre-sized elements. At step 240, the re-sized visual elements from the first and second groups may be combined to create the re-sized image of the target size.

In one embodiment, the pre-drawn visual elements in the first set of visual elements may be encompassed in a library containing sequential sizes of elements. In a preferred embodiment, the visual elements in a library of elements may be drawn in stepped sequential relation to the previous size element. In a preferred embodiment, the steps may be arranged such that the ratio of the size of the smallest to the second smallest element is the same, about the same, or approximately the same as the ratio of the second smallest element to the third smallest element, and so forth. Such an arrangement allows for efficient spacing of steps while reducing the number of pre-drawn elements in a given library of visual elements.

Figure 3:
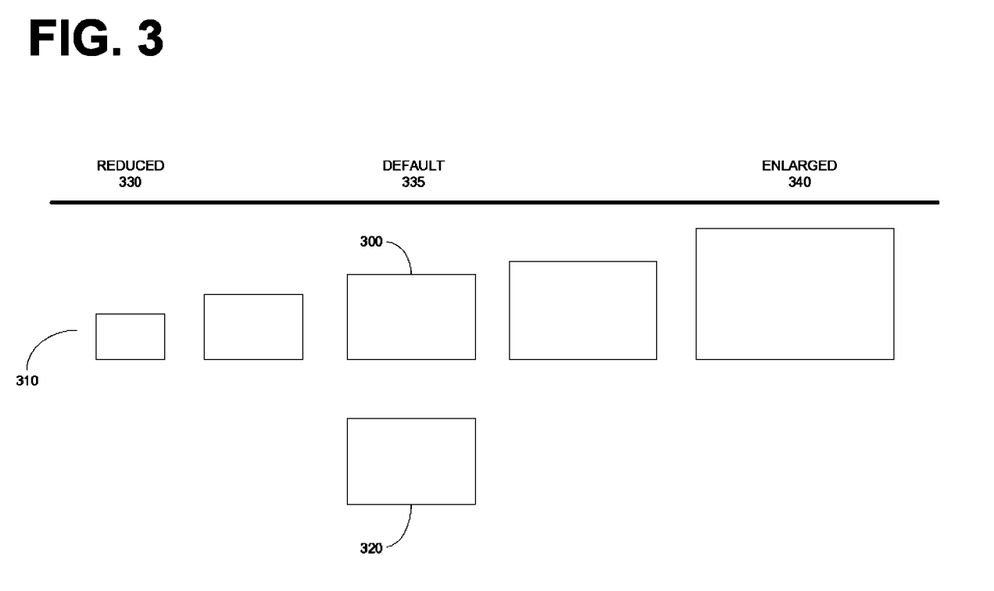
FIG. 3. provides a schematic representation of the determination of sizes of visual elements to be selected for a target image.

FIG. 3 illustrates visual elements in one embodiment of a digital image having two groups of visual elements. A first visual element 300 having a default size 335 is depicted in the first group. A visual element 320 is provided in the second group also having a default size 335. Preferably, the visual element of the second group is operably associated with a scaling algorithm such that when an instruction is provided to reduce the size of the image 330, the element 320 in the second group is reduced from its default size according to the associated algorithm. Once the element from the second group is scaled using the associated algorithm, the element 300 from the first group of visual elements is reduced by selecting from a library of pre-drawn elements 310 to correspond to the reduced size of the digital image. Alternatively, the size of the first visual element may be selected first, followed by a scaling of the second element using an algorithm to correspond to the size of the first element.

Figure 4:
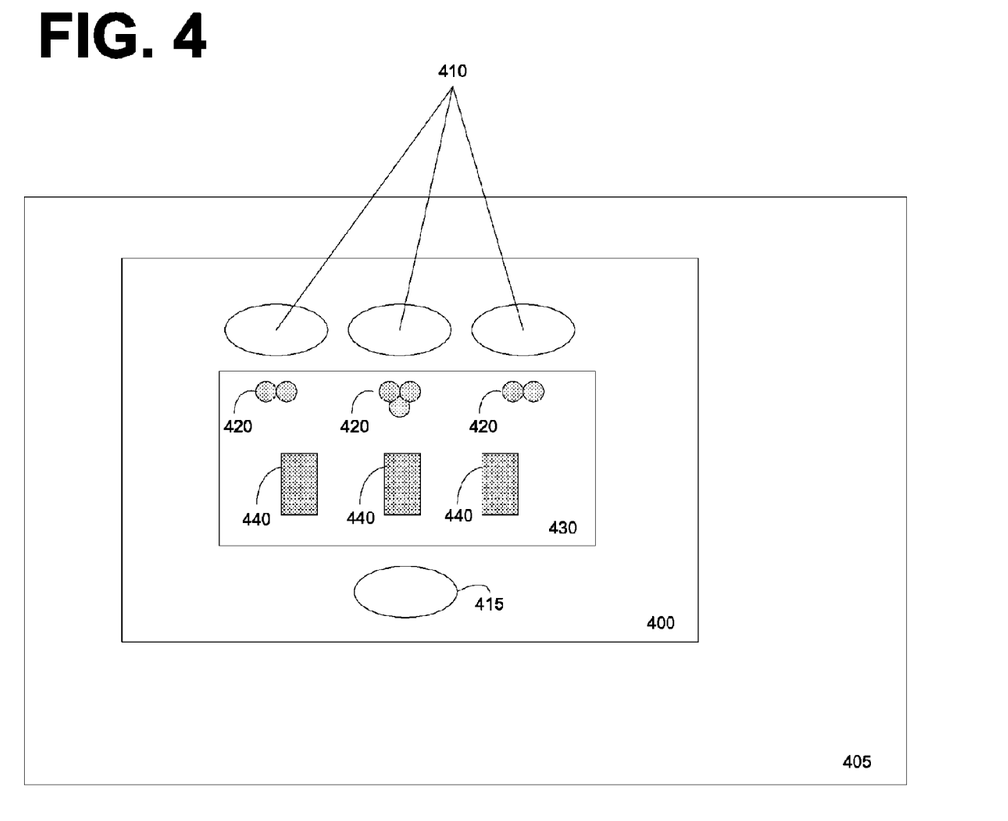
FIG. 4 provides a schematic representation of a first size image in one embodiment of the present disclosure.
Figure 5:
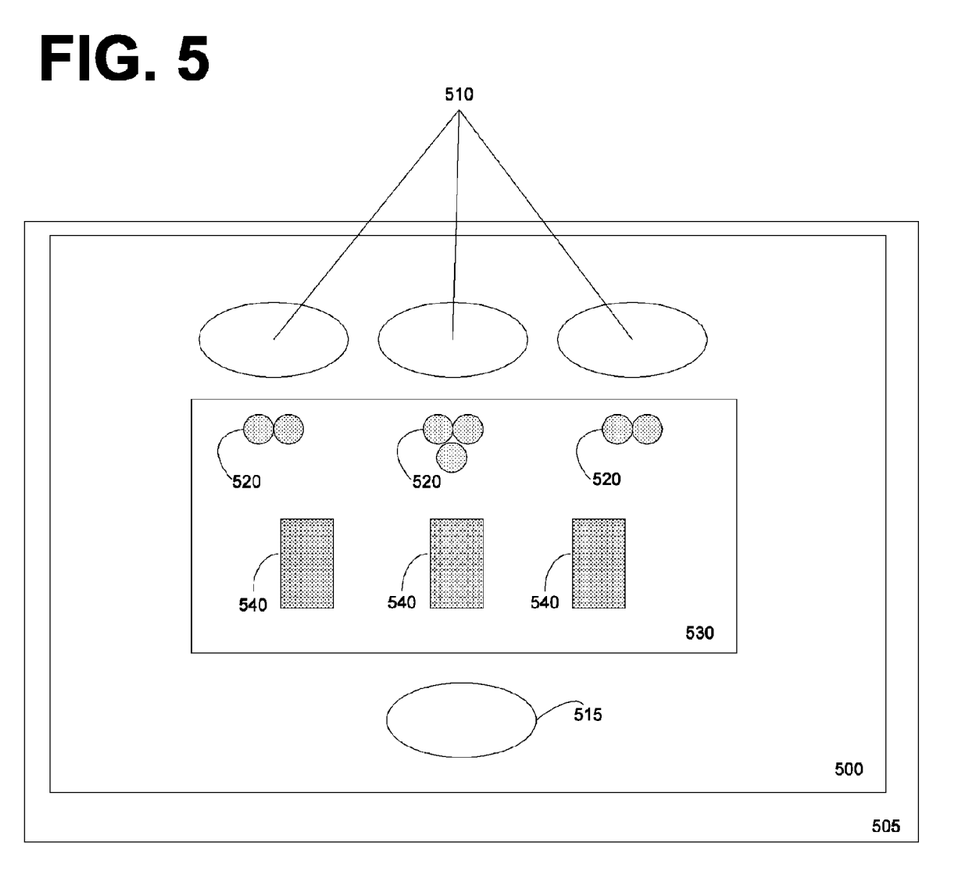
FIG. 5 provides a schematic representation of a target size image in one embodiment of the present disclosure.

Referring now to FIG. 4 and FIG. 5, an exemplary embodiment of the present disclosure is depicted, providing a first size image, FIG. 4, and a second size image, FIG. 5. In one embodiment, the methods disclosed herein may be applied to images in electronic games, such as an online poker gaming application. Referring first to FIG. 4, a schematic image 400 of an overhead view of a poker table is depicted. The image 400 occupies for example approximately one-quarter of the area of the computer screen 405. The image 400 comprises a plurality of players 410 and a dealer 415, a table 430, playing cards 440 and poker chips 420 for each player 410. The image may be resized, for example, by locating a mouse pointer over the right, bottom corner of the window containing the image, holding down the mouse button, dragging the mouse to resize the image, and releasing the mouse button.

Referring now to FIG. 5, a resized image 500 of an overhead view of the poker table in FIG. 4 is provided. Resize image 500 may be displayed on computer screen 505. In resizing the image of FIG. 4, some of the visual elements may be resized using a scaling algorithm (such as bilinear or bicubic algorithm), while other visual elements may be resized using pre-drawn graphics. In an alternative embodiment, the other visual images may be resized using the same or different resizing algorithms applied to pre-drawn graphics elements of appropriate resolution. In this example, the players 510, dealer 515 and table 530 may be resized using a bilinear algorithm from a single graphic drawing within the program. Other elements such as the cards 540 and chips 520 may be resized based on a selection of an appropriate sized element from a library of pre-sized visual elements based on the size of the players 510, dealer 515, and table 530.

Figure 6:
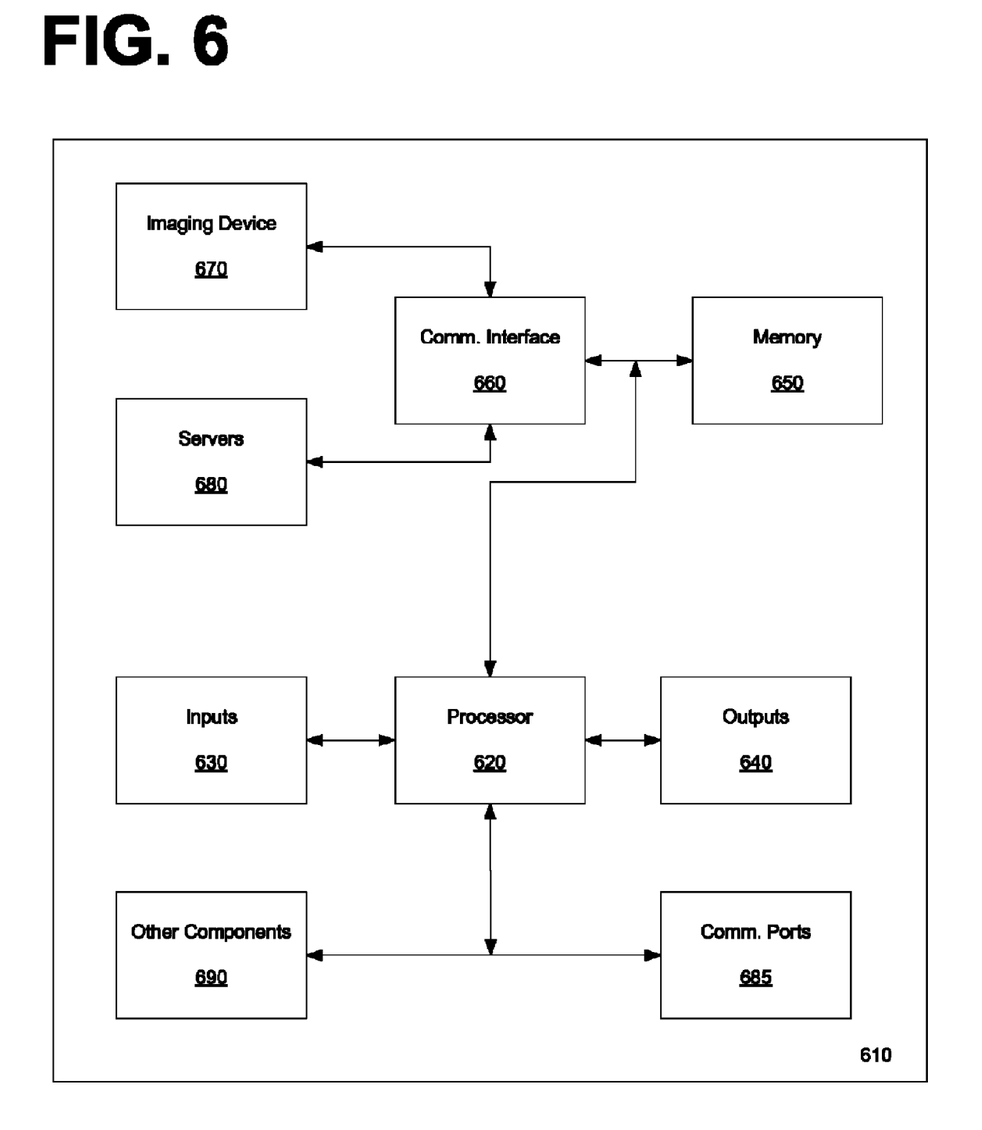
FIG. 6 provides a block diagram illustrating the major hardware components typically utilized with embodiments herein.

FIG. 6 is a block diagram illustrating the major hardware components typically utilized with embodiments herein. The systems and methods disclosed may be used with a computing device 610. Computing devices 610 are known in the art and are commercially available. The major hardware components typically utilized in a computing device 610 are illustrated in FIG. 6. A computing device 610 typically includes a processor 620 in electronic communication with input components or devices 630 and/or output components or devices 640. The processor 620 is operably connected to input 630 and/or output devices 640 capable of electronic communication with the processor 620, or, in other words, to devices capable of input and/or output in the form of an electrical signal. Embodiments of devices 610 may include the inputs 630, outputs 640 and the processor 620 within the same physical structure or in separate housings or structures.

The electronic device 610 may also include memory 650. The memory 650 may be a separate component from the processor 620, or it may be on-board memory 650 included in the same part as the processor 620. For example, microcontrollers often include a certain amount of on-board memory.

The processor 620 is also in electronic communication with a communication interface 660. The communication interface 660 may be used for communications with other devices 610, such as imaging devices 670, servers 680, etc. Thus, the communication interfaces 660 of the various devices 610 may be designed to communicate with each other to send signals or messages between the computing devices 610.

The computing device 610 may also include other communication ports 685. In addition, other components 690 may also be included in the electronic device 610.

Many kinds of different devices may be used with embodiments herein. The computing device 610 may be a one-chip computer, such as a microcontroller, a one-board type of computer, such as a controller, a typical desktop computer, such as an IBM-PC compatible, a Personal Digital Assistant (PDA), a Unix-based workstation, etc. Accordingly, the block diagram of FIG. 6 is only meant to illustrate typical components of a computing device 610 and is not meant to limit the scope of embodiments disclosed herein.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor may read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A computer-implemented method for modifying the size of an image having a plurality of visual elements displayed thereon, comprising:

receiving input from an input device indicating a target image size for a first image having a plurality of visual elements, wherein the plurality of visual elements are separated into a first group of visual elements and a second group of visual elements based upon a size of each respective visual element in comparison to the first image, the first group of visual elements containing relatively larger visual elements and the second group of visual elements containing relatively smaller visual elements;

scaling by a processor the first group of visual elements in the first image to a size based upon the target image size;

for each element within the second group of visual elements, selecting a replacement visual element from a plurality of pre-generated visual elements with different resolutions, wherein the resolution of the replacement visual elements is selected based upon the target image size;

for each element within the second group of visual elements, replacing the visual element with the selected replacement visual element; and combining the visual elements from the first and second group of visual elements to form a second image of the target image size for display on a display device.

2. The computer-implemented method of claim 1, wherein the first group of visual elements are scaled using a scaling algorithm selected from the group consisting of a bilinear algorithm, a bicubic algorithm, a Win32 StretchBlt algorithm, a Win32 StretchBlt with HALFTONE parameter algorithm, Mitchell algorithm, sinc algorithm, bessel algorithm, lanczos algorithm, catrom algorithm, cubic algorithm, quadratic algorithm, gaussian algorithm, blackman algorithm, hamming algorithm, hanning algorithm, hermite algorithm, triangle algorithm, box algorithm, and point algorithm.

3. The computer-implemented method of claim 1, wherein the second group of visual elements are pre-drawn elements, wherein the plurality of different sized visual elements for each element in the second group is arranged such that the ratio of sizes between each different size element is the same.

4. A computing device configured for scaling a first digital image having a plurality of visual elements from a first size to a second size, the computing device comprising:

a processor;

memory in electronic communication with the processor; and executable instructions executable by the processor, wherein the executable instructions are configured to implement a method comprising:

receiving input from an input device indicating a target image size for the first digital image having a plurality of visual elements, wherein the plurality of visual elements are separated into a first group of visual elements and a second group of visual elements based upon a size of each respective visual element in comparison to the first digital image, the first group of visual elements containing relatively larger visual elements and the second group of visual elements containing relatively smaller visual elements;

scaling the first group of visual elements in the first digital image to a size based upon the target image size;

for each element within the second group of visual elements, selecting a replacement visual element from a plurality of pre-generated visual elements with different resolutions, wherein the resolution of the replacement visual elements is selected based upon the target image size;

for each element within the second group of visual elements, replacing the visual element with the selected replacement visual element; and combining the visual elements from the first and second group of visual elements to form a second digital image of the target image size.

5. The computing device of claim 4, wherein the first group of visual elements is scaled using a scaling algorithm selected from the group consisting of a bilinear algorithm, a bicubic algorithm, a Win32 StretchBlt algorithm, a Win32 StretchBlt with HALFTONE parameter algorithm, Mitchell algorithm, sinc algorithm, bessel algorithm, lanczos algorithm, catrom algorithm, cubic algorithm, quadratic algorithm, gaussian algorithm, blackman algorithm, hamming algorithm, hanning algorithm, hermite algorithm, triangle algorithm, box algorithm, and point algorithm.

6. The computing device of claim 4, wherein the second group of visual elements are pre-drawn elements, wherein the plurality of different sized visual elements for each element in the second group is arranged such that the ratio of sizes between each different size element is the same.

7. A computer-readable storage medium including instructions that, when executed by a processor, perform a method for modifying the size of a first image having a plurality of visual elements, the method comprising:

receiving input from an input device indicating a target image size for the first image having a plurality of visual elements, wherein the plurality of visual elements are separated into a first group of visual elements and a second group of visual elements based upon a size of each respective visual element in comparison to the first image, the first group of visual elements containing relatively larger visual elements and the second group of visual elements containing relatively smaller visual elements;

scaling the first group of visual elements in the first image to a size based upon the target image size;

for each element within the second group of visual elements, selecting a replacement visual element from a plurality of pre-generated visual elements with different resolutions, wherein the resolution of the replacement visual elements is selected based upon the target image size;

for each element within the second group of visual elements, replacing the visual element with the selected replacement visual element; and combining the visual elements from the first and second group of visual elements to form a second image of the target image size.

8. The computer readable storage medium of claim 7, wherein the first group of visual elements is scaled using a scaling algorithm selected from the group consisting of a bilinear algorithm, a bicubic algorithm, a Win32 StretchBlt algorithm, a Win32 StretchBlt with HALFTONE parameter algorithm, Mitchell algorithm, sinc algorithm, bessel algorithm, lanczos algorithm, catrom algorithm, cubic algorithm, quadratic algorithm, gaussian algorithm, blackman algorithm, hamming algorithm, hanning algorithm, hermite algorithm, triangle algorithm, box algorithm, and point algorithm.

9. The computer readable storage medium of claim 7, wherein the second set of visual elements are pre-drawn elements, wherein the plurality of different sized visual elements for each element in the second set is arranged such that the ratio of sizes between each different size element is the same.

* * * * *